(12) United States Patent
Janardhanan

(10) Patent No.: US 9,407,500 B2
(45) Date of Patent: Aug. 2, 2016

(54) SYSTEM AND METHOD FOR DETERMINING THE CONFIGURATION OF SWITCHES IN VIRTUAL LINK TRUNKING ENVIRONMENTS

(71) Applicant: Dell Products L.P., Round Rock, TX (US)

(72) Inventor: Pathangi Narasimhan Janardhanan, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 313 days.

(21) Appl. No.: 13/750,507

(22) Filed: Jan. 25, 2013

(65) Prior Publication Data

US 2014/0215027 A1    Jul. 31, 2014

(51) Int. Cl.
| | | |
|---|---|---|
| *G06F 15/177* | (2006.01) | |
| *H04L 12/24* | (2006.01) | |
| *H04L 12/709* | (2013.01) | |
| *H04L 12/935* | (2013.01) | |

(52) U.S. Cl.
CPC .......... *H04L 41/0803* (2013.01); *H04L 45/245* (2013.01); *H04L 49/30* (2013.01); *Y02B 60/33* (2013.01); *Y02B 60/43* (2013.01)

(58) Field of Classification Search
CPC ... H04L 47/41; H04L 41/0803; H04L 45/245; H04L 49/30; H04L 49/15; H04L 49/70; H04L 49/201; Y02B 60/33
USPC ......................................................... 709/220
See application file for complete search history.

(56) References Cited

U.S. PATENT DOCUMENTS

| | | | | |
|---|---|---|---|---|
| 5,854,899 | A * | 12/1998 | Callon et al. ................... | 709/238 |
| 5,878,232 | A * | 3/1999 | Marimuthu .................... | 709/249 |
| 6,032,194 | A * | 2/2000 | Gai et al. ........................ | 709/239 |
| 6,434,611 | B1 * | 8/2002 | Wilson et al. .................. | 709/221 |
| 6,532,229 | B1 * | 3/2003 | Johnson et al. ................ | 370/351 |
| 6,560,236 | B1 * | 5/2003 | Varghese et al. .............. | 370/401 |
| 6,578,086 | B1 * | 6/2003 | Regan et al. ................... | 709/242 |
| 7,428,237 | B1 * | 9/2008 | Gai et al. .................. | 370/395.53 |
| 7,796,593 | B1 * | 9/2010 | Ghosh et al. ................... | 370/389 |
| 7,860,961 | B1 * | 12/2010 | Finkelstein et al. ........... | 709/223 |

(Continued)

OTHER PUBLICATIONS

Fibre Channel Link Services (FC-LS-2), Aug. 2, 2010, American National Standard for Information Technology, Secretariat: Information Technology Industry Council, REV 2.21.*

(Continued)

*Primary Examiner* — Ario Etienne
*Assistant Examiner* — Kidest Mendaye
(74) *Attorney, Agent, or Firm* — Haynes & Boone, LLP

(57) ABSTRACT

A system and method of determining the configuration of a network switching unit includes receiving a configuration message on a network link. The network switching unit is associated with a first switch ID and belongs to a domain associated with a first domain ID. The system and method further includes identifying a second domain ID and a second switch ID based on at least information associated with the configuration message; determining whether the first domain ID and the second domain ID match; if the first domain ID and the second domain ID match, adding the network link to a first link aggregation group (LAG) associated with the first switch ID and designating the first LAG as part of an intra cluster link (ICL); and if the first domain ID and the second domain ID do not match, adding the network link to a second LAG associated with the second domain ID.

20 Claims, 6 Drawing Sheets

(56) References Cited

U.S. PATENT DOCUMENTS

| | | | |
|---|---|---|---|
| 8,005,013 B2* | 8/2011 | Teisberg et al. | 370/254 |
| 8,209,403 B2* | 6/2012 | Szabo et al. | 709/220 |
| 8,213,296 B2* | 7/2012 | Shannon et al. | 370/216 |
| 8,291,011 B2* | 10/2012 | Abu-Hakima et al. | 709/203 |
| 8,346,912 B2* | 1/2013 | Bhadri et al. | 709/224 |
| 8,396,053 B2* | 3/2013 | Giles et al. | 370/352 |
| 8,493,872 B2* | 7/2013 | Smith et al. | 370/248 |
| 8,504,718 B2* | 8/2013 | Wang et al. | 709/238 |
| 8,520,508 B2* | 8/2013 | Zinjuvadia et al. | 370/222 |
| 8,751,647 B1* | 6/2014 | Yip et al. | 709/225 |
| 8,787,149 B1* | 7/2014 | Ramanathan et al. | 370/216 |
| 2007/0159983 A1* | 7/2007 | Eglin et al. | 370/254 |
| 2008/0016143 A1* | 1/2008 | Bumpus et al. | 709/203 |
| 2008/0062976 A1* | 3/2008 | Mittapalli et al. | 370/389 |
| 2008/0069100 A1* | 3/2008 | Weyman et al. | 370/390 |
| 2008/0310421 A1* | 12/2008 | Teisberg et al. | 370/395.53 |
| 2008/0320154 A1* | 12/2008 | Demmer et al. | 709/229 |
| 2010/0115416 A1* | 5/2010 | Chiou et al. | 715/738 |
| 2011/0032945 A1* | 2/2011 | Mullooly et al. | 370/401 |
| 2011/0085563 A1* | 4/2011 | Kotha et al. | 370/401 |
| 2011/0085569 A1* | 4/2011 | Gnanasekaran et al. | 370/419 |
| 2011/0271007 A1* | 11/2011 | Wang et al. | 709/238 |
| 2012/0084406 A1* | 4/2012 | Kumbalimutt | 709/220 |
| 2012/0266013 A1* | 10/2012 | Shannon et al. | 714/4.2 |
| 2012/0275297 A1* | 11/2012 | Subramanian | H04L 45/245 370/225 |
| 2012/0287787 A1* | 11/2012 | Kamble | H04L 49/70 370/235 |
| 2013/0022044 A1* | 1/2013 | Tatsumi | H04L 49/15 370/389 |
| 2013/0028135 A1* | 1/2013 | Berman | 370/254 |
| 2013/0051399 A1* | 2/2013 | Zhang et al. | 370/401 |
| 2013/0086206 A1* | 4/2013 | Sultenfuss et al. | 709/217 |
| 2013/0111048 A1* | 5/2013 | Tong et al. | 709/230 |
| 2013/0117766 A1* | 5/2013 | Bax et al. | 719/323 |
| 2013/0144995 A1* | 6/2013 | Ishii | 709/220 |
| 2013/0148654 A1* | 6/2013 | Sayani et al. | 370/389 |
| 2013/0151646 A1* | 6/2013 | Chidambaram et al. | 709/213 |
| 2013/0173810 A1* | 7/2013 | Subramaniam | 709/227 |
| 2013/0229912 A1* | 9/2013 | Yu et al. | 370/228 |
| 2013/0268590 A1* | 10/2013 | Mahadevan et al. | 709/204 |
| 2014/0003442 A1* | 1/2014 | Hernandez et al. | 370/401 |
| 2014/0064056 A1* | 3/2014 | Sakata | H04L 41/00 370/216 |
| 2014/0137109 A1* | 5/2014 | Sharma et al. | 718/1 |
| 2014/0143430 A1* | 5/2014 | Andrews et al. | 709/227 |
| 2014/0173093 A1* | 6/2014 | Rabeela et al. | 709/224 |
| 2014/0198649 A1* | 7/2014 | Jain | H04L 47/41 370/235 |
| 2014/0198788 A1* | 7/2014 | Nguyen et al. | 370/389 |
| 2014/0289379 A1* | 9/2014 | Yamaguchi | 709/220 |

OTHER PUBLICATIONS

"Amendment to Carrier Sense Multiple Access with Collision Detection (CSMA/CD) Access Method and Physical Layer Specifications—Aggregation of Multiple Link Segments LAN MAN", Standards Committee of the IEEE Computer Society Mar. 30, 2000. IEEE-SA Standards Board, IEEE Std 802.3ad-2000 (Amendment to IEEE Std 802.3, 1998 Edition).*

* cited by examiner

SYSTEM AND METHOD FOR DETERMINING THE CONFIGURATION OF SWITCHES IN VIRTUAL LINK TRUNKING ENVIRONMENTS

BACKGROUND

The present disclosure relates generally to information handling systems, and more particularly to determining the configuration of switches in virtual link trunking environments.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make routing decisions in order to deliver packets of information from a source system or first network node to a destination system or second network node. Due to the size, complexity, and dynamic nature of these networks, sophisticated network switching products are often required to implement the interconnection fabric. This can be further complicated through other networking trends such as network virtualization.

Many networks utilize parallelization and other techniques to improve the routing function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion in the form of a virtual link trunk (VLT). In a VLT, multiple network links and/or nodes are often bundled into a domain or cluster to support the parallelization function. For suitably aware network switching products, the VLT can offer a flexible option to select any of the network links in the VLT. And while VLTs offer additional flexibility in network topologies they also add complexity to the network configuration function.

Accordingly, it would be desirable to provide improved network switching products that can automatically determine the configuration of VLTs. It would also be desirable to provide network switching products that can automatically detect changes or errors in the VLT configuration.

SUMMARY

According to one embodiment, a method of determining the configuration of a network switching unit includes receiving a first configuration message on a first network link of a network switching unit. The network switching unit is associated with a first switch ID and belongs to a VLT domain (i.e., a domain) associated with a first domain ID. The method further includes identifying a second domain ID and a second switch ID based on at least information associated with the first configuration message; determining whether the first domain ID and the second domain ID match; in response to determining that the first domain ID and the second domain ID match, adding the first network link to a first link aggregation group (LAG) associated with the second switch ID and designating the first LAG as part of an intra cluster link (ICL); and in response to determining that the first domain ID and the second domain ID do not match, adding the first network link to a second LAG associated with the second domain ID.

According to another embodiment, a network switching unit includes a first network link for sending and receiving messages. The network switching unit is associated with a first switch ID. The network switching unit belongs to a domain associated with a first domain ID. The network switching unit is configured to receive a first configuration message on the first network link; identify a second domain ID and a second switch ID based on at least information associated with the first configuration message; determine whether the first domain ID and the second domain ID match; in response to determining that the first domain ID and the second domain ID match, add the first network link to a first link aggregation group (LAG) associated with the second switch ID and designate the first LAG as part of an intra cluster link (ICL); and in response to determining that the first domain ID and the second domain ID do not match, add the first network link to a second LAG associated with the second domain ID.

According to yet another embodiment, an information handling system includes a domain associated with a first domain ID. The domain includes a network switching unit associated with a first switch ID. The network switching unit includes a first network link for sending and receiving messages. The network switching unit is configured to receive a first configuration message on the first network link; identify a second domain ID and a second switch ID based on at least information associated with the first configuration message; determine whether the first domain ID and the second domain ID match; in response to determining that the first domain ID and the second domain ID match, add the first network link to a first link aggregation group (LAG) associated with the second switch ID and designate the first LAG as part of an intra cluster link (ICL); and in response to determining that the first domain ID and the second domain ID do not match, add the first network link to a second LAG associated with the second domain ID.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
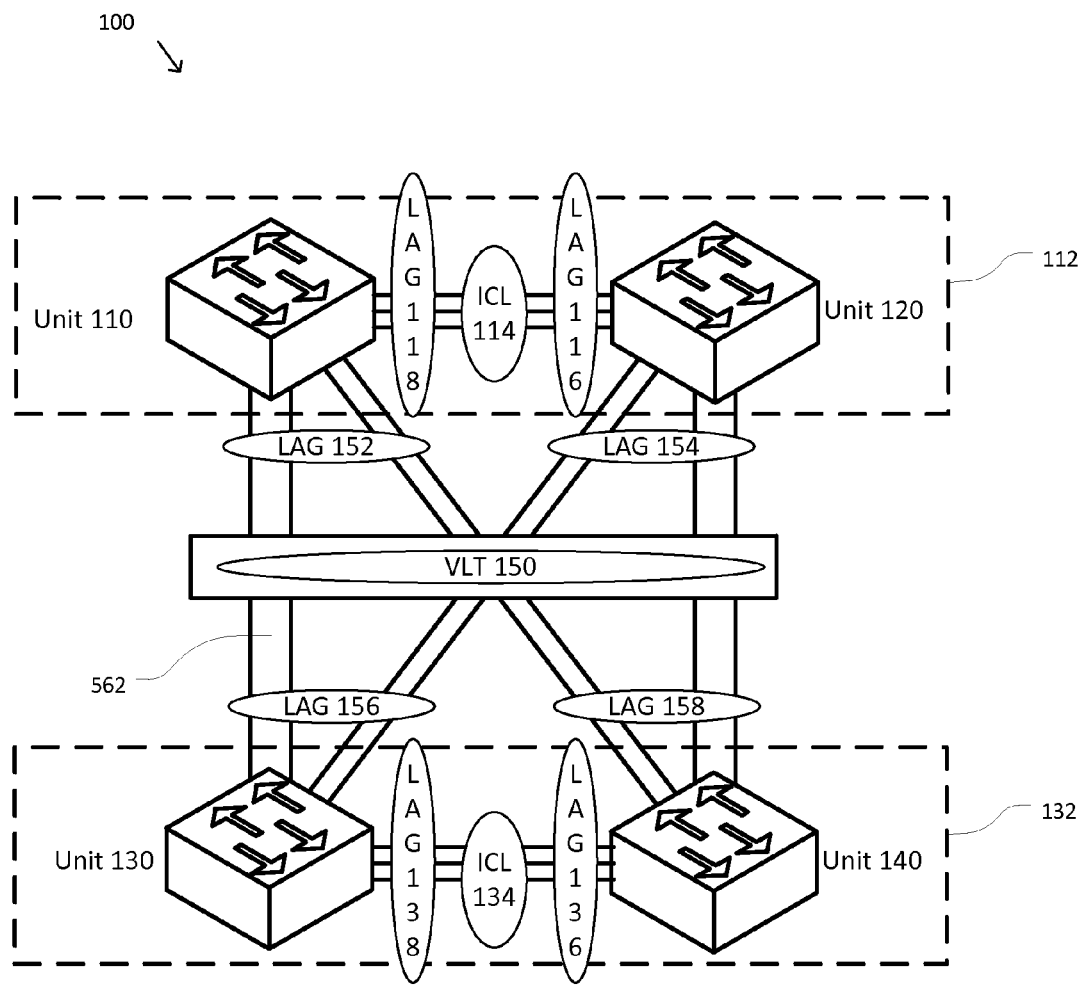
FIG. 1 shows a simplified diagram of a network according to some embodiments.

FIG. 1 shows a simplified diagram of a network 100 according to some embodiments. As shown in FIG. 1, the network 100 may include two VLT domains or clusters of network switching units, a domain 112 and a domain 132. The domain 112 may include a network switching unit 110 and a network switching unit 120. The domain 132 may include a network switching unit 130 and a network switching unit 140.

The domain 112 and the domain 132 may be coupled using a VLT 150. While not shown in FIG. 1, the network 100 may include additional VLANs and VLTs coupling the domain 112 and/or the domain 132 to other network switching units and/or domains in other parts of the network 100. The configuration of the network 100 may require the recognition of numerous interconnections (e.g., network links) among and between the network switching units and the domains. Recognition and grouping of the numerous interconnections may allow the network 100 to take advantage of the parallelization in the interconnections.

As shown in FIG. 1, the network links of the network 100 may be grouped into several link aggregation groups (LAGs) and inter cluster links (ICLs). A LAG is a mechanism used by a first network switching unit to group multiple network links between the first network switching unit and a second network switching unit into a single forwarding link unit. The first network switching unit may use any of the network links in the LAG to forward network traffic to the second network switching unit. The LAG may allow the first network switching unit to better take advantage of the parallel network connections it has with the second network switching unit. An ICL is a mechanism used by network switching units within a domain. A first network switching unit in the domain may designate a LAG between itself and a second network switching unit as part of the ICL so that it knows the LAG is to be used for intra-domain network traffic and domain messaging. As part of the configuration process of a network, it is generally advantageous to recognize all the LAGs and ICLs that are present. As FIG. 1 demonstrates, even for the relatively small network 100, there are a significant number of network links, LAGs, and ICLs that should be considered during the configuration process.

As shown in FIG. 1, the network switching unit 110 and the network switching unit 120 have three network links (e.g., the horizontal lines between the network switching unit 110 and the network switching unit 120) between them. The network switching unit 110 may be configured to group these three network links as a LAG 118. Because the LAG 118 connects the network switching unit 110 to the network switching unit 120 within the domain 112, the network switching unit 110 may also designate the LAG 118 as part of an ICL 114. Reciprocally, the network switching unit 120 may be configured to group the same three network links as a LAG 116 and to designate the LAG 116 as part of the ICL 114. The network switching units of the domain 132 may be similarly configured. The network switching unit 130 may be configured to group the network links it has with the network switching 140 as a LAG 138, which may be designated as part of and ICL 134. Reciprocally, the network switching unit 140 may be configured to group the network links it has with the network switching unit 130 as a LAG 136, which may be designated as part of the ICL 134.

The network links between the domain 112 and the domain 132 that are part of the VLT 150 should also be accounted for in the configuration of the network 100. As shown in FIG. 1, the network switching unit 110 may be configured to group the network links between the network switching unit 110 and the domain 132 (i.e., the network links between the network switching unit 110 and the network switching units 130 and 140) as a LAG 152. Similarly, the network switching unit 120 may be configured to group the network links it has with the domain 132 as a LAG 154, the network switching unit 130 may be configured to group the network links it has with the domain 112 as a LAG 156, and the network switching unit 140 may be configured to group the network links it has with the domain 112 as a LAG 158.

As discussed above and further emphasized here, FIG. 1 is merely an example, which should not unduly limit the scope of the claims. One of ordinary skill in the art would recognize many variations, alternatives, and modifications. According to some embodiments, the network 100 may include fewer than two domains or more than two domains. According to some embodiments, as more domains are added to the network 100, additional VLTs may be created. According to some embodiments, each of the domains 112 and 132 may include more than two network switching units. According to some embodiments, each of the domains 112 and 132 may include different numbers of network switching units. According to some embodiments, as additional network switching units are added to a domain, additional ICLs are designated among the network switching units. According to some embodiments, fewer or more network links than are shown in FIG. 1 may exist between any of the network switching units 110, 120, 130, and/or 140.

Given the number and complexity of the network links, LAGs, and ICLs between and among network switching units and domains in a network it would be advantageous if part or all of the configuration function for the network switching units could be automated. It would also be advantageous to have automated functions for updating the configuration of the network switching unit, verifying the configuration of the network switching unit, and to generate error messages when any errors in the configuration are detected.

Figure 2:
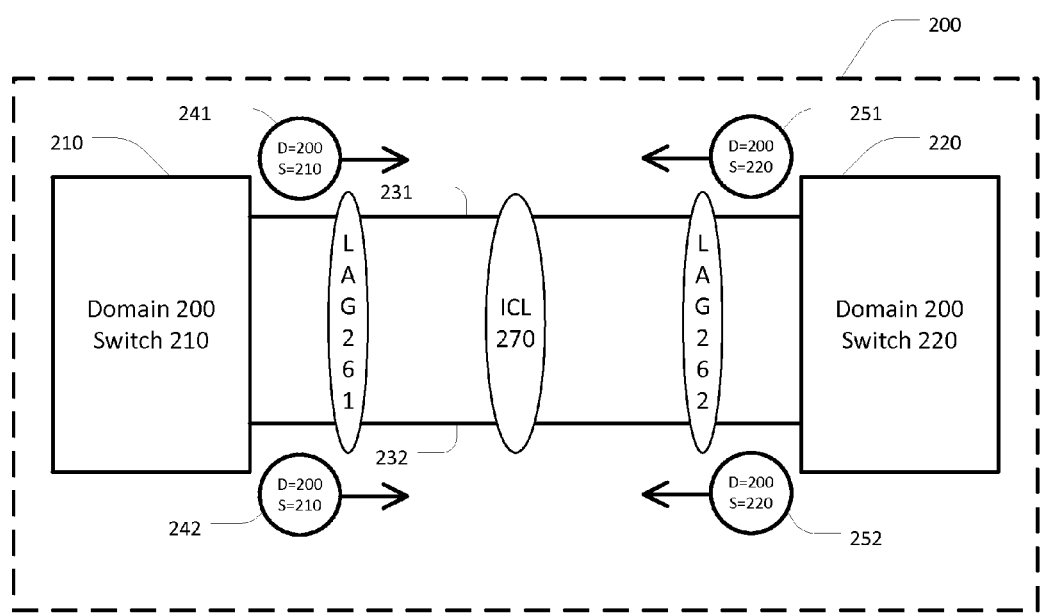
FIG. 2 shows a simplified diagram of a two switch VLT domain being configured according to some embodiments.

FIG. 2 shows a simplified diagram of a two switch VLT domain 200 being configured according to some embodiments. As shown in FIG. 2, the domain 200 may include a network switching unit 210 and a network switching unit 220. The network switching unit 210 and the network switching unit 220 may be connected by one or more network links 231, 232. The network switching unit 210 and the network switching unit 220 may each be assigned two identification numbers. A first identification number, i.e. a domain ID, may designate the VLT domain to which a network switching unit belongs. As shown in FIG. 2, both the network switching unit 210 and the network switching unit 220 may be given the domain ID of 200 to designate that they are part of the same VLT domain 200. A second identification number, i.e., a switch ID, may designate the particular network switching unit. In some embodiments, the switch ID may be a media access control (MAC) address assigned to the network switching unit as a whole. As shown in FIG. 2, the network switching unit 210 may be given the switch ID of 210 and the network switching unit 220 may be given the switch ID of 220.

In some embodiments, the domain ID may be assigned by the manufacturer of the domain. In some embodiments, the domain ID and/or the switch ID may be assigned by the manufacturer of the network switching unit. In some embodiments, the domain ID and/or switch ID may be encoded into each network switching unit using hardware. In some embodiments, the domain ID and/or the switch ID may be encoded into memory (e.g., ROM, RAM, EEPROM, or the like) included as part of the network switching unit. In some embodiments, the domain ID and/or the switch ID may be programmed into the network switching unit using a configuration utility. In some embodiments, the domain ID and/or the switch ID may be programmed into the network switching unit using a dynamic configuration mechanism like DHCP. In some embodiments, a network switching unit that is not part of a domain may be assigned a domain ID of zero.

As further shown in FIG. 2, the network switching unit 210 and the network switching unit 220 may each discover the network links 231, 232 that should be part of an ICL 270 between them using a message passing mechanism. The network switching unit 210 may broadcast a first configuration message 241 on the network link 231 and a second configuration message 242 on the network link 232 reporting its domain ID (e.g., D=200) and switch ID (e.g., S=210). The network switching unit 220 may broadcast a third configuration message 251 on the network link 231 and a fourth network configuration message 252 on the network link 232 reporting its domain ID (e.g., D=200) and switch ID (e.g., S=220).

When the network switching unit 210 receives the third configuration message 251 from the network switching unit 220 on the network link 231, it may use the third configuration message 251 to discover that the network link 231 connects the network switching unit 210 to the network switching unit 220 in the same domain 200. It may do this by observing that the domain ID (e.g., 200) and the switch ID (e.g., 220) are included in the third configuration message 251. The network switching unit 210 may further recognize that the third configuration message 251 includes the domain ID of 200, which matches its own domain ID. The network switching unit 210 may then create a LAG 261, which includes the network link 231, for communication with the network switching unit 220. The network switching unit 210 may further designate the LAG 261 as part of the ICL 270, because the LAG 261 connects with another network switching unit within the same VLT domain.

When the network switching unit 210 receives the fourth configuration message 252 from the network switching unit 220 on the network link 232, it may use the fourth configuration message 252 to discover that the network link 232 additionally connects the network switching unit 210 to the network switching unit 220 in the same domain 200. It may do this by observing that the domain ID (e.g., 200) and the switch ID (e.g., 220) are included in the fourth configuration message 252. The network switching unit 210 may further recognize that the fourth configuration message 252 includes the domain ID of 200, which matches its own domain ID. The network switching unit 210 may then add the network link 232 to the LAG 261, because the fourth configuration message 252 shared the same switch ID (e.g., 220) as the second configuration message 242. Thus, the network switching unit 210 may correctly discover the configuration between itself and the network switching unit 220.

Similarly, when the network switching unit 220 receives the first configuration message 241 from the network switching unit 210 on the network link 231, it may use the first configuration message 241 to discover that the network link 231 connects the network switching unit 220 to the network switching unit 210 in the same domain 200. It may do this by observing that the domain ID (e.g., 200) and the switch ID (e.g., 210) are included in the first configuration message 241. The network switching unit 220 may further recognize that the first configuration message 241 includes the domain ID of 200, which matches its own domain ID. The network switching unit 220 may then create a LAG 262, which includes the network link 231, for communication with the network switching unit 210. The network switching unit 220 may further designate the LAG 262 as part of the ICL 270, because the LAG 262 connects with another network switching unit within the same VLT domain.

When the network switching unit 220 receives the second configuration message 242 from the network switching unit 210 on the network link 232, it may use the second configuration message 242 to discover that the network link 232 additionally connects the network switching unit 220 to the network switching unit 210 in the same domain 200. It may do this by observing that the domain ID (e.g., 200) and the switch ID (e.g., 210) are included in the second configuration message 242. The network switching unit 220 may further recognize that the second configuration message 242 includes the domain ID of 200, which matches its own domain ID. The network switching unit 220 may then add the network link 232 to the LAG 262, because the second configuration message 242 shared the same switch ID (e.g., 210) as the fourth configuration message 252. Thus, the network switching unit 220 may correctly discover the configuration between itself and network switching unit 210.

Figure 3:
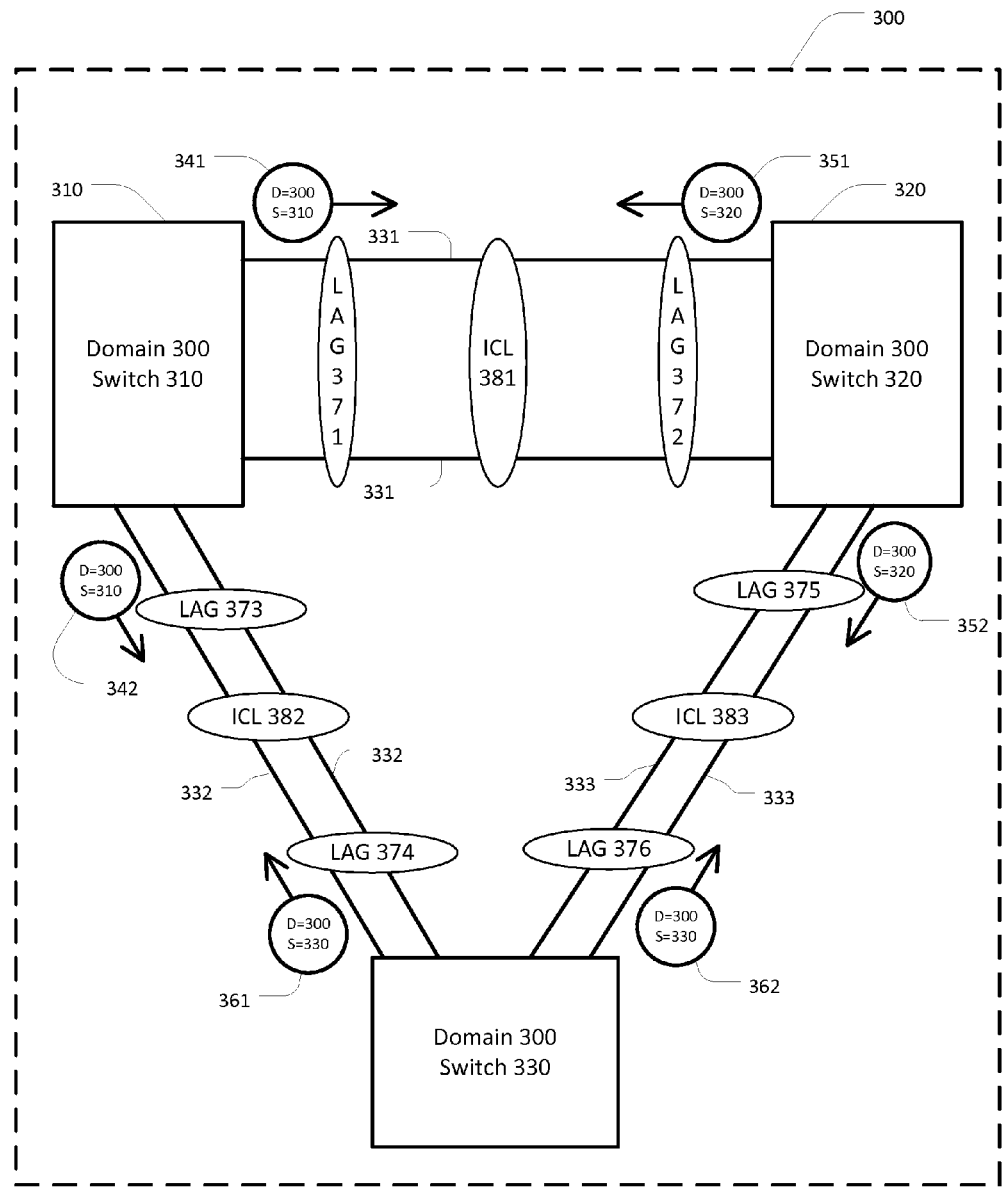
FIG. 3 shows a simplified diagram of a three switch VLT domain being configured according to some embodiments.

FIG. 3 shows a simplified diagram of a three switch VLT domain 300 being configured according to some embodiments. As shown in FIG. 3, the domain 300 may include a network switching unit 310, a network switching unit 320, and a network switching unit 330. The network switching unit 310 and the network switching unit 320 may be connected by one or more network links 331. The network switching unit 310 and the network switching unit 330 may be connected by one or more network links 332. The network switching unit 320 and the network switching unit 330 may be connected by one or more network links 333. The network switching unit 310 may be assigned a domain ID of 300 and a switch ID of 310. The network switching unit 320 may be assigned a domain ID of 300 and a switch ID of 320. The network switching unit 330 may be assigned a domain ID of 300 and a switch ID of 330.

As further shown in FIG. 3, the network switching units 310, 320, and 330 may discover the configuration of the network links 331, 332, and 333 using a message passing mechanism. The network switching unit 310 may broadcast first configuration messages 341 on the network links 331 and second configuration messages 342 on the network links 332 reporting its domain ID (e.g., D=300) and switch ID (e.g., S=310). The network switching unit 320 may broadcast third configuration messages 351 on the network links 331 and fourth configuration messages 352 on the network links 333 reporting its domain ID (e.g., D=300) and switch ID (e.g., S=320). The network switching unit 330 may broadcast fifth configuration messages 361 on the network links 332 and sixth configuration messages 362 on the network links 333 reporting its domain ID (e.g., D=300) and switch ID (e.g., S=330).

When the network switching unit 310 receives the third configuration messages 351 from the network switching unit 320 on the network links 331, it may use the third configuration messages 351 to discover that the network links 331 connect the network switching unit 310 to the network switching unit 320 in the same domain 300. It may do this by observing that the domain ID (e.g., 300) and the switch ID (e.g., 320) are included in the third configuration messages 351. The network switching unit 310 may further recognize that the third configuration messages 351 include the domain ID of 300, which matches its own domain ID. The network switching unit 310 may then create a LAG 371, which includes the network links 331, for communication with the network switching unit 320. The network switching unit 310 may further designate the LAG 371 as part of an ICL 381.

When the network switching unit 310 receives the fifth configuration messages 361 from the network switching unit 330 on the network links 332, it may use the fifth configuration messages 361 to discover that the network links 332 connect the network switching unit 310 to the network switching unit 330 in the same domain 300. It may do this by observing that the domain ID (e.g., 300) and the switch ID (e.g., 330) are included in the fifth configuration messages 361. The network switching unit 310 may further recognize that the fifth configuration messages 361 include the domain ID of 300, which matches its own domain ID. The network switching unit 310 may then create a LAG 373, which includes the network links 332, for communication with the network switching unit 330. The network switching unit 310 may further designate the LAG 373 as part of an ICL 382. Thus, the network switching unit 310 may correctly discover the configuration between itself and the network switching units 320 and 330.

Similarly, when the network switching unit 320 receives the first configuration messages 341 from the network switching unit 310 on the network links 331, it may use the first configuration messages 341 to discover that the network links 331 connect the network switching unit 320 to the network switching unit 310 in the same domain 300. It may do this by observing that the domain ID (e.g., 300) and the switch ID (e.g., 310) are included in the first configuration messages 341. The network switching unit 320 may further recognize that the first configuration messages 341 include the domain ID of 300, which matches its own domain ID. The network switching unit 320 may then create a LAG 372, which includes the network links 331, for communication with the network switching unit 310. The network switching unit 320 may further designate the LAG 372 as part of the ICL 381.

When the network switching unit 320 receives the sixth configuration messages 362 from the network switching unit 330 on the network links 333, it may use the sixth configuration messages 362 to discover that the network links 333 connect the network switching unit 320 to the network switching unit 330 in the same domain 300. It may do this by observing that the domain ID (e.g., 300) and the switch ID (e.g., 330) are included in the sixth configuration messages 362. The network switching unit 320 may further recognize that the sixth configuration messages 362 include the domain ID of 300, which matches its own domain ID. The network switching unit 320 may then create a LAG 375, which includes the network links 333, for communication with the network switching unit 330. The network switching unit 320 may further designate the LAG 375 as part of an ICL 383. Thus, the network switching unit 320 may correctly discover the configuration between itself and the network switching units 310 and 330.

Similarly, when the network switching unit 330 receives the second configuration messages 342 from the network switching unit 310 on the network links 332, it may use the second configuration messages 342 to discover that the network links 332 connect the network switching unit 330 to the network switching unit 310 in the same domain 300. It may do this by observing that the domain ID (e.g., 300) and the switch ID (e.g., 310) are included in the second configuration messages 342. The network switching unit 330 may further recognize that the second configuration messages 342 include the domain ID of 300, which matches its own domain ID. The network switching unit 330 may then create a LAG 374, which includes the network links 332, for communication with the network switching unit 310. The network switching unit 330 may further designate the LAG 374 as part of the ICL 382.

When the network switching unit 330 receives the fourth configuration messages 352 from the network switching unit 320 on the network links 333, it may use the fourth configuration messages 352 to discover that the network links 333 connect the network switching unit 330 to the network switching unit 320 in the same domain 300. It may do this by observing that the domain ID (e.g., 300) and the switch ID (e.g., 320) are included in the fourth configuration messages 352. The network switching unit 330 may further recognize that the fourth configuration messages 352 include the domain ID of 300, which matches its own domain ID. The network switching unit 330 may then create a LAG 376, which includes the network links 333, for communication with the network switching unit 320. The network switching unit 330 may further designate the LAG 376 as part of the ICL 383. Thus, the network switching unit 330 may correctly discover the configuration between itself and the network switching units 310 and 320.

As discussed above and further emphasized here, FIGS. 2 and 3 are merely examples, which should not unduly limit the scope of the claims. One of ordinary skill in the art would recognize many variations, alternatives, and modifications. According to some embodiments, the domains 200 and/or 300 may include four or more network switching units. According to some embodiments, there may be one or more than three network links between any two network switching units in the domains 200 and/or 300.

Figure 4:
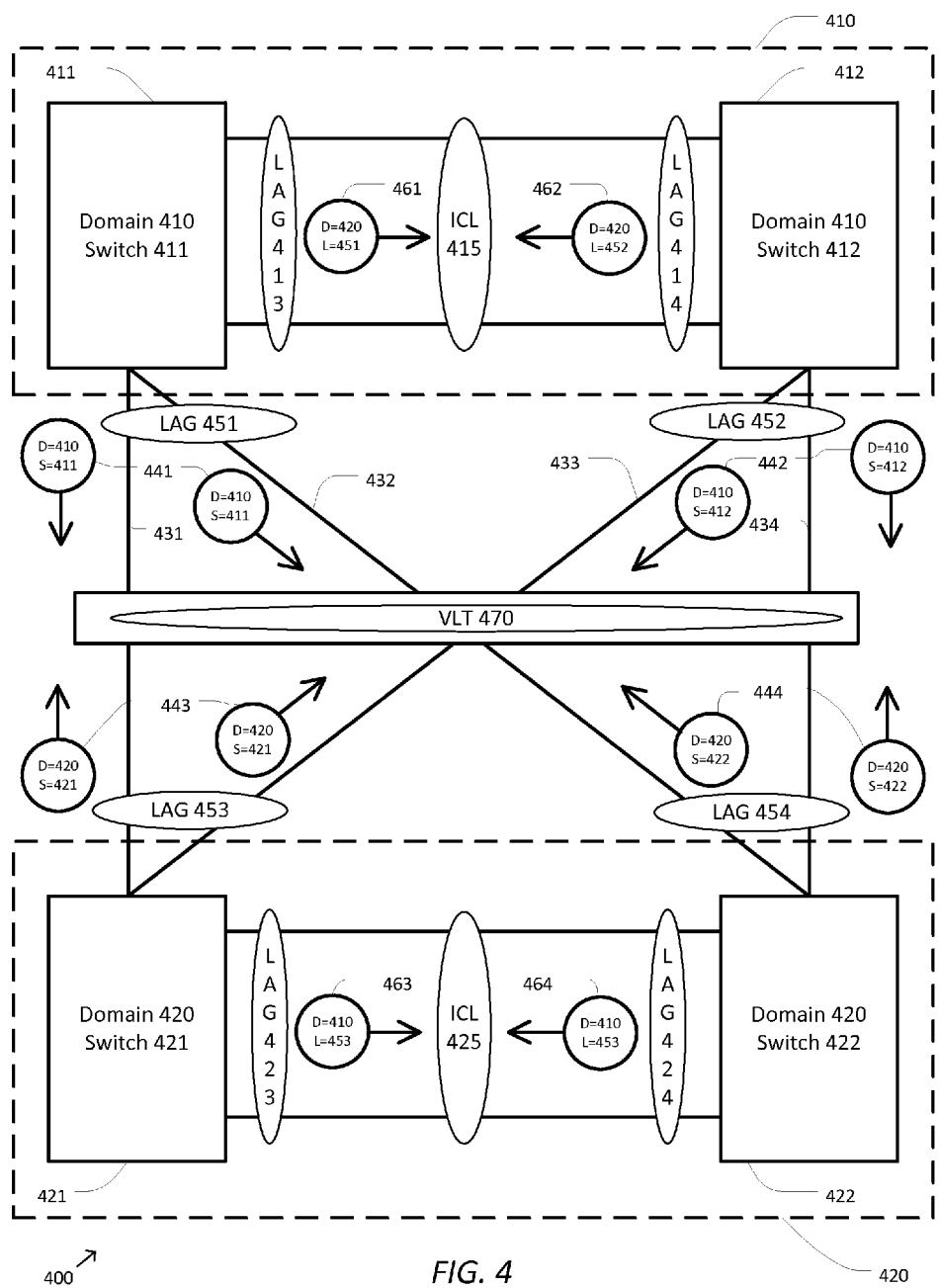
FIG. 4 shows a simplified diagram of a two VLT domain network being configured according to some embodiments.

FIG. 4 shows a simplified diagram of a two VLT domain network 400 being configured according to some embodiments. As shown in FIG. 4, the network 400 may include a domain 410 and a domain 420. The domain 410 may include a network switching unit 411 and a network switching unit 412. The domain 420 may include a network switching unit 421 and a network switching unit 422. The network 400 may further include one or more network links 431 connecting the network switching unit 411 and the network switching unit 421, one or more network links 432 connecting the network switching unit 411 and the network switching unit 422, one or more network links 433 connecting the network switching unit 412 and the network switching unit 421, and one or more network links 434 connecting the network switching unit 412 and the network switching unit 422. Although not shown, the network 400 may use the message passing mechanism of FIGS. 2 and/or 3 to discover the configuration of network links between the network switching unit 411 and the network switching unit 412 in the domain 410 and the configuration of network links between the network switching unit 421 and the network switching unit 422 in the domain 420. As a result of this configuration, the network switching unit 411 may form a LAG 413 of network links to the network switching unit 412 and may designate the LAG 413 as part of an ICL 415. Additionally, the network switching unit 412 may form a LAG 414 of network links to the network switching unit 411 and may designate the LAG 414 as part of the ICL 415. Similarly, the network switching unit 421 may form a LAG 423 of network links to the network switching unit 422 and may designate the LAG 423 as part of an ICL 425. Additionally, the network switching unit 422 may form a LAG 424 of network links to the network switching unit 421 and may designate the LAG 424 as part of the ICL 425.

The network switching units 411, 412, 421, and/or 422 may additionally use the message passing mechanism to discover the configuration of the network links 431, 432, 433, and/or 434 and/or a VLT 470. The network switching unit 411 may send first configuration messages 441 to the network switching unit 421 using each of the network links 431 and to the network switching unit 422 using each of the network links 432. Each of the first configuration messages 441 may include a domain ID of 410 and a switch ID of 411. The network switching unit 412 may send second configuration messages 442 to the network switching unit 421 using each of the network links 433 and to the network switching unit 422 using each of the network links 434. Each of the second configuration messages 442 may include a domain ID of 410 and a switch ID of 412. The network switching unit 421 may send third configuration messages 443 to the network switching unit 411 using each of the network links 431 and to the network switching unit 412 using each of the network links 433. Each of the third configuration messages 443 may include a domain ID of 420 and a switch ID of 412. The network switching unit 422 may send fourth configuration messages 444 to the network switching unit 411 using each of the network links 432 and to the network switching unit 412 using each of the network links 434. Each of the fourth configuration messages 444 may include a domain ID of 420 and a switch ID of 422.

When the network switching unit 411 receives the third configuration messages 443 from the network switching unit 421 on the network links 431, it may use the third configuration messages 443 to discover that the network links 431 connect the network switching unit 411 to the network switching unit 421 in the domain 420. The network switching unit 411 may further recognize that the third configuration messages 443 include the domain ID of 420, which differs from its own domain ID of 410. The network switching unit 411 may then create a LAG 451, which includes the network links 431, for communication with the domain 420.

When the network switching unit 411 receives the fourth configuration messages 444 from the network switching unit 422 on the network links 432, it may use the fourth configuration messages 444 to discover that the network links 432 connect the network switching unit 411 to the network switching unit 422 in the domain 420. The network switching unit 411 may further recognize that the fourth configuration messages 444 include the domain ID of 420, which differs from its own domain ID of 410. The network switching unit 411 may then add the network links 432 to the LAG 451 for communication with domain 420 because the fourth configuration messages 444 include the same domain ID of 420 as the third configuration messages 443. It may not be necessary for the network switching unit 411 to create separate LAGs for communication with the network switching unit 421 and the network switching unit 422 because it knows that they are both in the same domain 420 and either network switching unit may be used to forward network traffic to network nodes beyond domain 420.

The network switching unit 411 may additionally designate the LAG 451 as part of the VLT 470. The network switching unit 411 may also notify the network switching unit 412 of the VLT 470 connecting the network switching unit 411 with the domain 420 through the LAG 451 by sending a fifth configuration message 461 via the ICL 415 with a domain ID of 420 and a LAG ID of 451. Thus, the network switching unit 411 may correctly discover the configuration between itself and the network switching units 421 and 422.

Similarly, the network switching unit 412 may use the third configuration messages 443 from the network switching unit 421 it receives on the network links 433 and the fourth configuration messages 444 from the network switching unit 422 it receives on the network links 434 to create and place network links 433 and network links 434 into a LAG 452. The network switching unit 412 may then designate the LAG 452 as part of the VLT 470 and notify the network switching unit 411 of the VLT 470 by sending a sixth configuration message 462 via the ICL 415 with a domain ID of 420 and a LAG ID of 452. The network switching unit 412 may then use the LAG 452 for sending network traffic to the domain 420 and beyond.

In similar fashion, the network switching unit 421 may use the first configuration messages 441 from the network switching unit 411 it receives on the network links 431 and the second configuration messages 442 from the network switching unit 412 it receives on the network links 433 to create and place the network links 431 and the network links 433 into a LAG 453. The network switching unit 421 may then designate the LAG 453 as part of the VLT 470 and notify the network switching unit 422 of the VLT 470 by sending a seventh configuration message 463 via the ICL 425 with a domain ID of 410 and a LAG ID of 453. The network switching unit 421 may then use the LAG 453 for sending network traffic to the domain 410 and beyond.

In similar fashion, the network switching unit 422 may use the first configuration messages 441 from the network switching unit 411 it receives on the network links 432 and the second configuration messages 442 from the network switching unit 412 it receives on the network links 434 to create and place the network links 432 and the network links 434 into a LAG 454. The network switching unit 422 may then designate the LAG 454 as part of the VLT 470 and notify the network switching unit 421 of the VLT 470 by sending an eighth configuration message 464 via the ICL 425 with a domain ID of 410 and a LAG ID of 454. The network switching unit 422 may then use the LAG 454 for sending network traffic to the domain 410 and beyond.

Thus, the network switching units 412, 421, and/or 422 may also correctly discover the configuration of the network.

Figure 5:
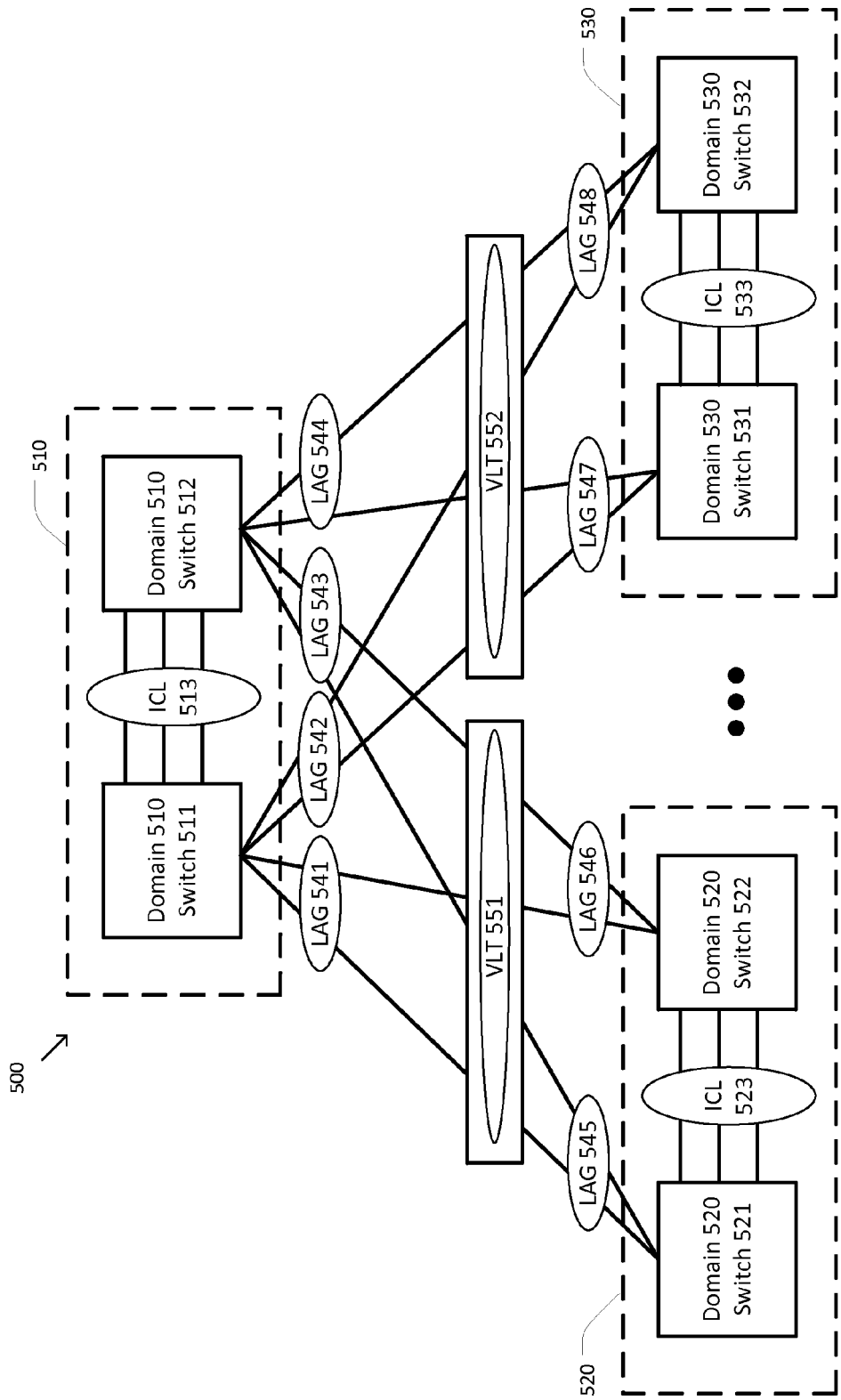
FIG. 5 shows a simplified diagram of a multi-VLT domain network after configuration according to some embodiments.

The message passing mechanism may also handle networks with even more complexity. FIG. 5 shows a simplified diagram of a multi-VLT domain network 500 after configuration according to some embodiments. As shown in FIG. 5, the network 500 may include domains 510, 520, and 530. The domain 510 may include network switching units 511 and 512, the domain 520 may include network switching units 521 and 522, and the domain 530 may include network switching units 531 and 532. The network switching unit 511 may use configuration messages received from the network switching unit 512 over network links to create a LAG, assign the corresponding network links to the LAG, and designate the LAG as part of an ICL 513 by recognizing that each of the configuration messages include a domain ID of 510 that matches its own and a same switch ID of 512 as described above with respect to FIGS. 2 and/or 3. In similar fashion, the network switching unit 512 may recognize the configuration for the ICL 513, the network switching unit 521 may recognize the configuration for an ICL 523, the network switching unit 522 may recognize the configuration for the ICL 523, the network switching unit 531 may recognize the configuration for an ICL 533, and the network switching unit 532 may recognize the configuration for the ICL 533.

The network switching unit 511 may also use configuration messages received from the network switching unit 521 and the network switching unit 522 to create a LAG 541 and to assign corresponding network links that form a connection between the network switching unit 511 and the domain 520 by recognizing that each of the configuration messages includes the domain ID of 520 that differs from its own domain ID of 510, but have the same domain ID of 520 among the corresponding configuration messages. The network switching unit 511 may also designate the LAG 541 as part of a VLT 551 and notify the network switching unit 512 of this by sending a suitable configuration message on ICL 513.

Similarly, the network switching unit 511 may also use configuration messages received from the network switching unit 531 and the network switching unit 532 to create a LAG 542 and to assign corresponding network links that form a connection between the network switching unit 511 and the domain 530 by recognizing that each of the configuration messages includes the domain ID of 530 that differs from its own domain ID of 510, but have the same domain ID of 530 among the corresponding configuration messages. The network switching unit 511 may also designate the LAG 542 as part of a VLT 552 and notify the network switching unit 512 of this by sending a suitable configuration message on ICL 513.

A similar strategy may be used to create LAGs 543-548, to designate the LAGS 543-548 as part of the corresponding VLT 551 or 552, and to notify other network switching units within the same domain. Thus, each of the network switching units 511, 512, 521, 522, 531, and/or 532 may discover the configuration of the network 500 through the use of message passing. This includes the network switching units 511 and 512, which may sort out and discover the configuration between the multiple neighboring domains 520 and 530.

As discussed above and further emphasized here, FIGS. 4 and 5 are merely examples, which should not unduly limit the scope of the claims. One of ordinary skill in the art would recognize many variations, alternatives, and modifications. According to some embodiments, the domains 410, 420, 510, 520, and/or 530 may include three or more network switching units. According to some embodiments, there may be one or more than two network links between any two network switching units in the domains 410, 420, 510, 520, and/or 530. According to some embodiments, the domain 510 may be connected to more than two domains. According to some embodiments, the domains 520 and/or 520 may be connected to more domains than just the domain 510.

As demonstrated by FIGS. 2, 3, 4, and/or 5, a message passing mechanism may be used to discover the configuration of a network including multiple domains each including multiple network switching units interconnected using multiple network links. The configuration of the network may be discovered by each network switching unit located in domain A by using two general rules:

Rule 1: If a configuration message includes a domain ID of A and is received on a network link, group that network link with other network links into an intra-domain LAG where each of the configuration messages received on those network links share the same switch ID of B. Then designate the intra-domain LAG as part of an ICL for communication with the network switching device with the switch ID of B.

Rule 2: If a configuration message is received on a network link that includes a domain ID of C (different from A), group that network link with other network links into an inter-domain LAG where each of the configuration messages received on those network links share the same domain ID of C. Then designate the inter-domain LAG as part of a VLT for communicating with the domain with the switch ID of C.

According to some embodiments, the message passing mechanism for configuration may be compatible with the Link Layer Discovery Protocol (LLDP). In the LLDP, a network switching unit may share its identity and capabilities with neighboring network switching units. An LLDP frame includes a sequence of several mandatory type-length-value (TLV) fields and may additionally include other optional TLV fields. Using the LLDP, the message passing mechanism of FIGS. 2, 3, 4, and/or 5 may be implemented by creating three optional TLV fields. The first of the optional TLV fields may be used for the domain ID and the second of the optional TLV fields may be used for the switch ID. A network switching unit may then broadcast its domain ID and switch ID by sending an LLDP frame with a domain ID TLV field and a switch ID TLV field on each of its network links. Each of the network switching devices neighbors may then receive a corresponding one of the LLDP frames via each of the corresponding network links it shares with the network switching unit. Once received, the domain ID TLV and switch ID TLV may be extracted from each of the LLDP frames and Rules 1 and 2 may be applied to configure LAGs and ICLs for the receiving network switching unit. The third optional TLV field may be used for the LAG ID used to notify other network switching devices in the same domain of the designation of a LAG associated with the LAG ID as part of a corresponding VLT.

Figure 6:
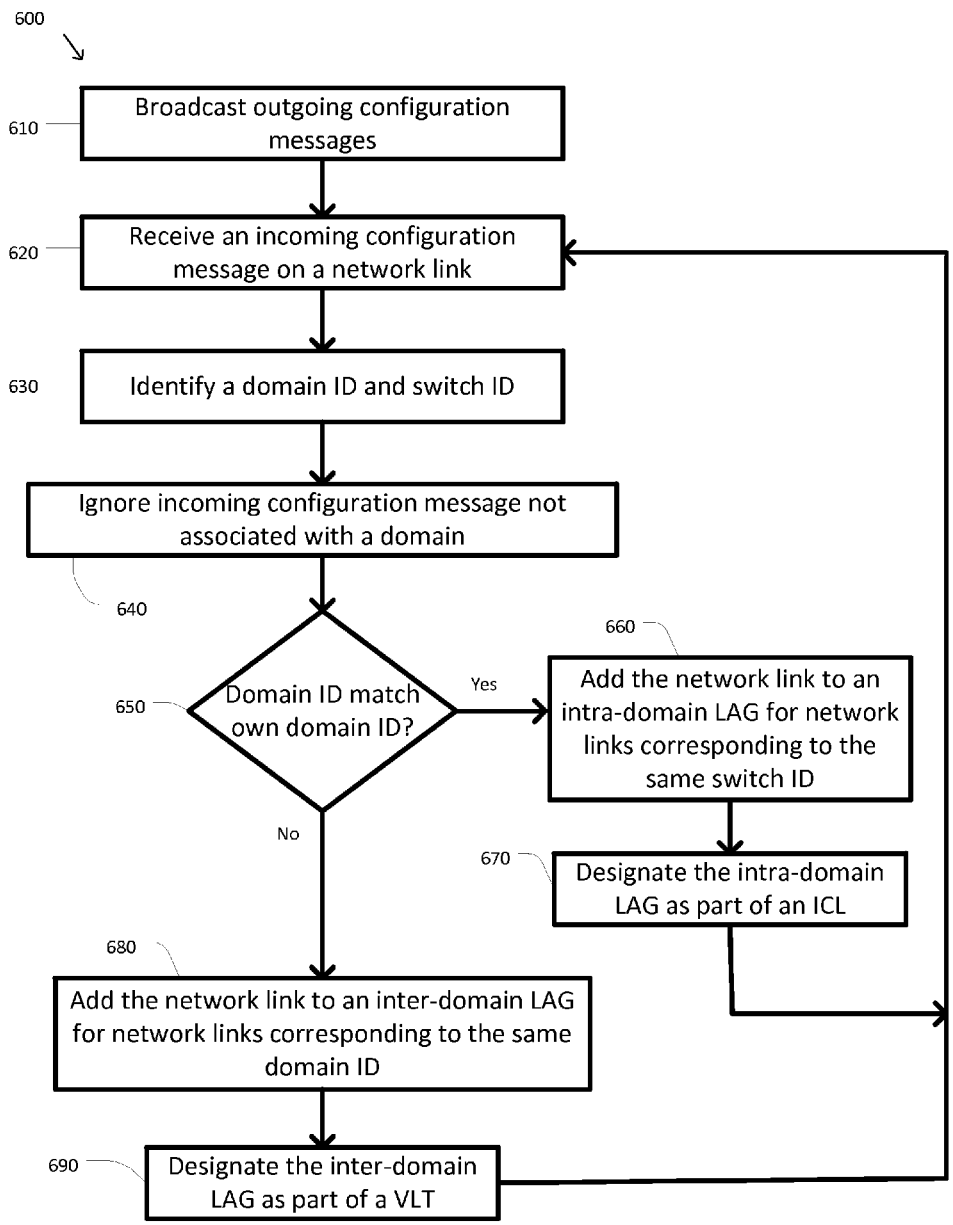
FIG. 6 shows a simplified diagram of a method of determining the configuration of one or more network links of a network switching unit according to some embodiments.

FIG. 6 shows a simplified diagram of a method 600 of determining the configuration of one or more network links of a network switching unit according to some embodiments. As shown in FIG. 6, the method 600 includes a process 610 for broadcasting outgoing configuration messages, a process 620 for receiving an incoming configuration message on a network link, a process 630 for identifying a domain ID and a switch ID, a process 640 for ignoring the incoming configuration message when not associated with a domain, a process 650 for determining if the incoming domain ID matches the domain ID of the network switch, a process 660 for adding the network link to an intra-domain LAG for network links corresponding to the same incoming switch ID, a process 670 for designating the intra-domain LAG as an ICL, a process 680 for adding the network link to an inter-domain LAG for network links corresponding to the same incoming domain ID, and a process 690 for designating the inter-domain LAG as part of a VLT. According to certain embodiments, the method 600 of determining the configuration of one or more network links of a network switching unit can be performed using variations among the processes 610-690 as would be recognized by one of ordinary skill in the art. In some embodiments, one or more of the processes 610-690 may be implemented, at least in part, in the form of executable code stored on non-transient, tangible, machine readable media that when run by one or more processors (e.g., the network switching units 110, 120, 130, 140, 210, 220, 310, 320, 330, 411, 412, 421, 422, 511, 512, 521, 522, 531, and/or 532) may cause the one or more processors to perform one or more of the processes 610-690.

At the process 610, a network switching unit (e.g., the network switching units 110, 120, 130, 140, 210, 220, 310, 320, 330, 411, 412, 421, 422, 511, 512, 521, 522, 531, and/or 532) may broadcast an outgoing configuration message (e.g., the configuration message 241, 242, 251, 252, 341, 342, 351, 352, 361, 362, 441, 442, 443, and/or 444) on each of one or more network links (e.g., the network links 231, 232, 331, 332, 333, 431, 432, 433, and/or 434) to other network switching units. The configuration message may include a domain ID of the network switching unit and a switch ID of the network switching unit.

At the process 620, the network switching unit may receive an incoming configuration message (e.g., the configuration message 241, 242, 251, 252, 341, 342, 351, 352, 361, 362, 441, 442, 443, and/or 444) on a first network link.

At the process 630, an incoming domain ID and an incoming switch ID may be identified based on information associated with the incoming configuration message. In some embodiments, the incoming domain ID and the incoming switch ID may be extracted from the incoming configuration message. In some embodiments, the incoming domain ID and the incoming switch ID may be data fields encapsulated into the incoming configuration message.

At the process 640, the incoming configuration message is ignored when the incoming configuration message is not associated with a domain. In some embodiments, the incoming message may not be associated with a domain when the incoming domain ID is zero. In some embodiments, the incoming message may not be associated with a domain when the incoming configuration message does not contain the incoming domain ID.

At the process 650, it may be determined whether the incoming domain ID matches the domain ID of the network switch. In some embodiments, the incoming domain ID is compared to the domain ID of the network switch to determine if they are the same. When the incoming domain ID matches the domain ID of the network switch, the method 600 proceeds to the process 660. When the incoming domain ID does not match the domain ID of the network switch, the method 600 proceeds to the process 680.

At the process 660, the first network link may be added to an intra-domain LAG (e.g., the LAG 261, 262, 371, 372, 373, 374, 375, 376, 413, 414, 423, and/or 424) for network links that correspond to the same incoming switch ID. If the intra-domain LAG does not exist, it may be created before the first network link is added to it. In some embodiments, the intra-domain LAG may be used by the network switching unit to forward network traffic to a network switching unit corresponding to the incoming switch ID.

At the process 670, the intra-domain LAG may be designated as part of an ICL (e.g., the ICL 270, 381, 382, 383, 415, 425, 513, 523, and/or 533). In some embodiments, the ICL may be used for domain messaging between the network switching unit and the network switching unit corresponding to the incoming switch ID. When the process 670 completes, the method 600 returns to the process 620 where another incoming configuration message may be received on a second network link.

At the process 680, the first network link may be added to an inter-domain LAG (e.g., the LAG 451, 452, 453, 454, 541, 542, 543, 544, 545, 546, 547, and/or 548) for network links that correspond to the same incoming domain ID. If the inter-domain LAG does not exist, it may be created before the first network link is added to it. In some embodiments, the inter-domain LAG may be used by the network switching unit to forward network traffic to a domain corresponding to the incoming domain ID.

At the process 690, the inter-domain LAG may be designated as part of a VLT (e.g., the VLT 470, 551, and/or 552). The network switching unit may also notify other network switching units in its own domain of the VLT by broadcasting a VLT configuration message via each of the ICLs. When the process 690 completes, the method 600 returns to the process 620 where another incoming configuration message may be received on a second network link.

As discussed above and further emphasized here, FIGS. 2, 3, 4, 5, and/or 6 are merely examples, which should not unduly limit the scope of the claims. One of ordinary skill in the art would recognize many variations, alternatives, and modifications. According to some embodiments, the message passing mechanism may be used for purposes other than automatic configuration of network switching units. In some embodiments, the network switching units may periodically rebroadcast configuration messages including their domain ID and switch ID. When these rebroadcast configuration messages are received at other network switching devices they may be used by the other network switching devices to verify that the network is actually configured according to a configuration already known to the respective network switching unit. In some embodiments, any deviation between the actual configuration according to the configuration messages and the known configuration may generate one or more error messages. In some embodiments, the known configuration may limit a domain to a fixed number of network switching units and the configuration messages may indicate that there are more network switching units in the domain than expected. In some embodiments, the configuration messages may be used to verify a configuration specified by a user. In some embodiments, any changes detected in the actual configuration may be used to update the known configuration for use during future forwarding of network traffic.

Some embodiments of network switching units 110, 120, 130, 140, 210, 220, 310, 320, 330, 411, 412, 421, 422, 511, 512, 521, 522, 531, and/or 532 may include non-transient, tangible, machine readable media that include executable code that when run by one or more processors may cause the one or more processors to perform the processes of method 600 as described above. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   receiving a first configuration message on a first network link of a network switching unit, the network switching unit being assigned a first switch ID and belonging to a domain being assigned a first domain ID;
   identifying a second domain ID and a second switch ID based on at least information contained in the first configuration message;
   determining whether the first domain ID and the second domain ID match;
   in response to determining that the first domain ID and the second domain ID match:
      adding the first network link to a first link aggregation group (LAG) associated with the second domain ID; and
      designating the first LAG as part of an intra cluster link (ICL);
   in response to determining that the first domain ID and the second domain ID do not match, adding the first network link to a second LAG associated with the second domain ID; and
   forwarding, by the network switching unit, network traffic using the first LAG and the second LAG to improve the forwarding by the network switching unit and redundancy of a network.

2. The method of claim 1, further comprising:
   formatting a second configuration message including at least information associated with the first domain ID and the first switch ID; and
   broadcasting the second configuration message on each of one or more second network links, the one or more second network links including the first network link.

3. The method of claim 1, further comprising ignoring the first configuration message when it is not associated with any domain.

4. The method of claim 3 wherein ignoring the first configuration message includes detecting that the second domain ID is zero.

5. The method of claim 3 wherein ignoring the first configuration message includes detecting that the first configuration message does not include information associated with the second domain ID.

6. The method of claim 1 wherein the first configuration message comprises a domain ID field including at least the second domain ID and a switch ID field including at least the second switch ID.

7. The method of claim 1 wherein the first configuration message is a Link Layer Discovery Protocol (LLDP) frame.

8. The method of claim 1, further comprising configuring the network switching unit using at least the first LAG, the second LAG, and the ICL.

9. The method of claim 1, further comprising verifying a configuration of the network switching unit using at least the first LAG, the second LAG, and the ICL.

10. The method of claim 9, further comprising generating an error message if the configuration of the network switching unit cannot be verified.

11. The method of claim 1, further comprising updating a configuration of the network switching unit based on at least information associated with the first configuration message.

12. The method of claim 1, further comprising:
    determining whether the first LAG exists; and
    in response to determining that the first LAG does not exist, creating the first LAG before adding the first network link to the first LAG.

13. The method of claim 1, further comprising:
    determining whether the second LAG exists; and
    in response to determining that the second LAG does not exist, creating the second LAG before adding the first network link to the second LAG.

14. The method of claim 1, further comprising encoding the first domain ID and the first switch ID into one or more memory devices of the network switching unit.

15. The method of claim 1 wherein in response to determining that the first domain ID and the second domain ID do not match, the method further comprises:
    designating the second LAG as part of a virtual link trunk (VLT);
    associating the second LAG with a LAG ID;
    formatting a second configuration message including a least information associated with the second domain ID and the LAG ID; and
    sending the second configuration message via the ICL.

16. A network switching unit, the network switching unit comprising:
    a first network link for sending and receiving messages;
    wherein:
       the network switching unit is associated with a first switch ID;
       the network switching unit belongs to a domain, the domain being associated with a first domain ID; and
       the network switching unit is configured to:
          receive a first configuration message on the first network link;
          identify a second domain ID and a second switch ID based on at least information associated with the first configuration message;
          determine whether the first domain ID and the second domain ID match;
          in response to determining that the first domain ID and the second domain ID match:

add the first network link to a first link aggregation group (LAG) associated with the second domain ID; and designate the first LAG as part of an intra cluster link (ICL);

in response to determining that the first domain ID and the second domain ID do not match, add the first network link to a second LAG associated with the second domain ID; and forward network traffic using the first LAG and the second LAG to improve the forwarding by the network switching unit and redundancy of a network.

17. The network switching unit of claim 16, further comprising:

one or more second network links, the one or more second network links including the first network link; and wherein the network switching unit is further configured to:

format a second configuration message including at least information associated with the first domain ID and the first switch ID; and broadcast the second configuration message on each of the one or more second network links.

18. The network switching unit of claim 16 wherein the network switching unit is further configured to configure the network switching unit using at least the first LAG, the second LAG, and the ICL.

19. The network switching unit of claim 16 wherein the network switching unit is further configured to verify a configuration of the network switching unit using at least the first LAG, the second LAG, and the ICL.

20. An information handling system comprising:

a domain associated with a first domain ID;

the domain comprising a network switching unit associated with a first switch ID and comprising a first network link for sending and receiving messages;

wherein the network switching unit is configured to:

receive a first configuration message on the first network link;

identify a second domain ID and a second switch ID based on at least information associated with the first configuration message;

determine whether the first domain ID and the second domain ID match;

in response to determining that the first domain ID and the second domain ID match:

add the first network link to a first link aggregation group (LAG) associated with the second domain ID; and designate the first LAG as part of an intra cluster link (ICL);

in response to determining that the first domain ID and the second domain ID do not match, add the first network link to a second LAG associated with the second domain ID; and forward network traffic using the first LAG and the second LAG to improve the forwarding by the network switching unit and redundancy of the information handling system.

* * * * *